United States Patent
Briffaud et al.

(10) Patent No.: US 12,384,883 B2
(45) Date of Patent: Aug. 12, 2025

(54) METHOD FOR THE PRODUCTION OF TRANSPARENT POLYAMIDES

(71) Applicant: Arkema France, Colombes (FR)

(72) Inventors: Thierry Briffaud, Serquigny (FR);
Benjamin Saillard, Serquigny (FR);
Stefânia Cassiano Gaspar, Serquigny (FR); Joël Verger, Serquigny (FR);
Fabienne Olivier-Chanu, Serquigny (FR)

(73) Assignee: ARKEMA FRANCE, Puteaux (FR)

( * ) Notice: Subject to any disclaimer, the term of this patent is extended or adjusted under 35 U.S.C. 154(b) by 1097 days.

(21) Appl. No.: 17/282,067

(22) PCT Filed: Oct. 2, 2019

(86) PCT No.: PCT/FR2019/052334
§ 371 (c)(1),
(2) Date: Aug. 30, 2021

(87) PCT Pub. No.: WO2020/070446
PCT Pub. Date: Apr. 9, 2020

(65) Prior Publication Data
US 2022/0267519 A1      Aug. 25, 2022

(30) Foreign Application Priority Data

Oct. 3, 2018 (FR) .................................. 1859173

(51) Int. Cl.
*C08G 69/26* (2006.01)
*C08G 69/36* (2006.01)

(52) U.S. Cl.
CPC .................. *C08G 69/265* (2013.01)

(58) Field of Classification Search
None
See application file for complete search history.

(56) References Cited

U.S. PATENT DOCUMENTS 4,205,159 A     5/1980 Meyer et al.
4,268,661 A  *  5/1981 Schmid .................. C08G 69/36
                                                     528/346

(Continued)

FOREIGN PATENT DOCUMENTS

CN      101405323 A    4/2009
CN      102010589 A    4/2011

(Continued)

OTHER PUBLICATIONS

Office Action (the First Office Action) issued on Jan. 31, 2023, by the China National Intellectual Property Administration in corresponding Chinese Patent Application No. 201980074852.6, English Translation only. (8 pages).

(Continued)

*Primary Examiner* — Ha S Nguyen
(74) *Attorney, Agent, or Firm* — Boone IP Law

(57) ABSTRACT

A process for manufacturing a transparent polyamide including a step of polycondensation of a mixture of monomers including at least one dicarboxylic acid and at least one cycloaliphatic diamine, in which the cycloaliphatic diamine includes two rings linked by an alkylene group including 1 to 6 carbon atoms, each ring being substituted by an amine group and at least one alkyl group, which may be identical or different, including 1 to 6 carbon atoms, wherein the diamine decomposes into six isomer fractions when it is subjected to analysis by gas chromatography on a nonpolar column and, when the isomer fractions are named isomer fractions I to VI in their order of elution, the mass content $F_I$ of fraction I of the cycloaliphatic diamine does not exceed 35%. A transparent polyamide capable of being obtained by the process, and to articles obtained from such a polyamide or from such a formulation.

11 Claims, 3 Drawing Sheets

(56) References Cited

U.S. PATENT DOCUMENTS

| | | | |
|---|---|---|---|
| 4,731,421 A | 3/1988 | Hoppe et al. | |
| 4,898,896 A * | 2/1990 | Maj | C08G 69/36 |
| | | | 528/331 |
| 2010/0022742 A1* | 1/2010 | Buhler | C08G 69/265 |
| | | | 528/323 |
| 2011/0023986 A1 | 2/2011 | Hoffmann et al. | |

FOREIGN PATENT DOCUMENTS

| | | |
|---|---|---|
| EP | 0313436 A1 | 4/1989 |
| FR | 1541384 A | 10/1968 |
| JP | 2009-525362 A | 1/2013 |
| JP | 2011-032469 A | 9/2014 |
| JP | 2021-143211 A | 9/2021 |
| WO | 2009153534 A1 | 12/2009 |
| WO | WO-2019225422 A1 * | 11/2019 |

OTHER PUBLICATIONS

Office Action (English translation only) mailed on Sep. 14, 2023, by the Japanese Patent Office for Japanese Application No. 2021-518627, 11 pages.

International Search Report (PCT/ISA/210) and Written Opinion (PCT/ISA/237) mailed on Feb. 12, 2020, by the European Patent Office as the International Searching Authority for International Application No. PCT/FR2019/052334.

* cited by examiner

METHOD FOR THE PRODUCTION OF TRANSPARENT POLYAMIDES

TECHNICAL FIELD

The present patent application relates to an improved process for manufacturing transparent polyamides. It also relates to the use of a cycloaliphatic diamine having a specific isomeric composition for improving the transparency of polyamides and the stability thereof after a heat treatment. The present application furthermore relates to transparent polyamides able to be obtained by such a process and also to articles manufactured from such polyamides.

PRIOR ART

Amorphous polyamides, for example those described in the application EP 0 313 436 A1, obtained from cycloaliphatic diamines and aromatic acids and a lactam or amino acid, combine excellent transparency with high chemical resistance, and their transparency is additionally resistant to boiling water. These polymers are of interest for example for the manufacture of sterilizable articles such as respiratory masks, optical articles such as spectacle frames and lenses, and also domestic electrical appliances.

Nevertheless, it has been found that the transparency of these polyamides and their thermal stability do not always meet expectations. Thus, it has been observed that the transparency of certain polyamides manufactured on batch production lines sometimes deteriorates gradually, necessitating frequent cleaning of the reactors which considerably harms productivity.

In addition, although the transparency of these polymers usually resists boiling water well, it has been observed that certain polyamide batches opacify when they have been exposed to heat, whether during manufacture, for example in the case of a heating plateau, or during use, for example when they are immersed in boiling water.

A manufacturing process for polyamides is thus sought which is better controlled and which in particular makes it possible to obtain polyamides having a transparency that meets expectations and is preserved even after a heat treatment.

The cycloaliphatic diamines most frequently used for the manufacture of transparent polyamides comprise two cyclohexane groups which are linked to one another via an alkylene group and are each substituted by an amine group and where appropriate by one or more other alkyl substituents. Due to their chemical structure, these compounds exist in the form of a large number of stereoisomers. This is because each substituent of the cyclohexane may be located in equatorial or axial position on the cyclohexane and in trans or cis position relative to the alkylene group connecting the two rings. Other isomerism possibilities arise from the fact that the two cyclohexanes may assume different conformations. As a result, these cycloaliphatic diamines generate a multitude of isomers.

A few documents report the study of the impact of bis(4-aminocyclohexyl)methane (called "PACM" or "P") isomers on the properties of the polyamides.

For instance, it is known from French patent FR 1 541 384 that polyamides based on PACM obtained only with the trans-trans isomer of the diamine are opaque. This document teaches that a mixture comprising 30%-80% of trans-trans isomers and less than 10% of cis-cis isomers makes it possible to obtain transparent polyamides the transparency of which is resistant to boiling water.

In addition, it is known that the trans-trans isomers of PACM accelerate the crystallization of polyamides obtained by polycondensation with aliphatic diacids and, up to a content of 70%, increase the melting point and the glass transition temperature of these polyamides (Prince, Frank R., Pearce, Eli M. "The effect of isomer ratio on the Properties of Bis(4-aminocyclohexyl)methane polyamides", Macromolecules 4/3, pp 347-350, 5/1971).

In contrast, more complex cycloaliphatic diamines such as bis(3-methyl-4-aminocyclohexyl)methane (called "BMACM" or "B") have not yet been the subject of in-depth studies.

This is because the additional presence of an alkyl group on each ring multiplies the isomerism possibilities, as illustrated in FIG. 3. Considering just this source of isomerism, there are therefore at least 16 stereoisomers for BMACM.

At present, the diamine BMACM is sold by various companies such as BASF, Sigma Aldrich and Jiangsu Qingquan Chemical Co., Ltd. These diamines are sold without specification of their stereoisomer composition, which can vary depending on the process for obtaining them and also over time following process changes.

SUMMARY OF THE INVENTION

The aim of the invention is to propose a manufacturing process for transparent polyamides based on cycloaliphatic diamines such as BMACM, the process being better controlled and in particular making it possible to obtain polyamides having a transparency which is preserved following a heat treatment.

Specifically, the present invention is based on the discovery that it is possible, by selecting a particular isomeric profile of these diamines, to ensure a satisfactory transparency of the polyamides, including when the latter have been exposed to heat.

In view of current knowledge, the loss of transparency is correlated with the appearance of structures which are infusible up to an elevated temperature which may range up to 300° C. or even beyond. As a result, the structures are preserved during the steps of transformation of the polyamide. Once induced, the opacification is therefore irreversible below the decomposition temperature of the polyamide. It is assumed that these structures are formed under the effect of heat from products of reaction of certain stereoisomers of the diamine with certain diacids.

Thus, the idea underlying the present invention is that of using a cycloaliphatic diamine having a specific isomeric profile in order to avoid the formation of these infusible structures and to obtain polyamides having a transparency which is preserved even when they are exposed to heat.

The use of a cycloaliphatic diamine with such an isomeric profile makes it possible to produce many successive batches of polyamide without needing to clean the reactors, thus increasing productivity.

Thus, according to a first aspect, a subject of the invention is a process for manufacturing transparent polyamides comprising a step of polycondensation of a mixture of monomers comprising at least one dicarboxylic acid and at least one cycloaliphatic diamine, in which said cycloaliphatic diamine comprises two rings linked by an alkylene group comprising 1 to 6 carbon atoms, each ring being substituted by an amine group and at least one alkyl group, which may be identical or different, comprising 1 to 6 carbon atoms, characterized in that said cycloaliphatic diamine decomposes into six isomer fractions when it is subjected to analysis by gas chromatography on a nonpolar column and in that, when said isomer fractions are named isomer fractions I to VI in their order of elution, the mass content $F_I$ of isomer fraction I of said cycloaliphatic diamine does not exceed 35%.

Preferably, the cycloaliphatic diamine is also characterized by a mass content of isomer fraction $F_{II}$ which is greater than its mass content of isomer fraction $F_I$.

Advantageously, the cycloaliphatic diamine is additionally characterized by a difference $\Delta F_{II/I}$ between the mass content of isomer fraction II and of isomer fraction I which is greater than 0% and preferably greater than 5%.

Advantageously, the process according to the invention is implemented with a cycloaliphatic diamine comprising two cyclohexane rings linked by a linear or branched alkylene group comprising 1 to 4 carbon atoms, in particular methylene or propylene, in which the cyclohexane rings are each substituted by an amine group, preferably at position 4, and one or two linear or branched alkyl groups comprising 1 to 6 carbon atoms, in particular methyl or ethyl.

In particular, the diamine can be chosen from bis(3-methyl-4-aminocyclohexyl)methane (also called BMACM or MACM or B), 2,2'-bis(3-methyl-4-aminocyclohexyl)propane, bis(3-methyl-5-ethyl-4-aminocyclohexyl)methane, bis(3,5-dimethyl-4-aminocyclohexyl)methane, bis(3,5-dimethyl-4-aminocyclohexyl)propane, bis(2,3-dimethyl-4-aminocyclohexyl)methane, bis(2,3-dimethyl-4-aminocyclohexyl)propane, bis(3,5-diethyl-4-aminocyclohexyl)methane, bis(3,5-diethyl-4-aminocyclohexyl)propane, bis(3-methyl-5-isopropyl-4-aminocyclohexyl)methane and bis(3-methyl-5-isopropyl-4-aminocyclohexyl)propane.
Particular preference is given to bis(3-methyl-4-aminocyclohexyl)methane.

Preferably, the process according to the invention is implemented with a dicarboxylic acid which is an aromatic diacid, in particular terephthalic acid.

In particular, the dicarboxylic acid can be a mixture of terephthalic acid and isophthalic acid comprising at least 50 mol %, in particular at least 60 mol % and very particularly at least 75 mol % of terephthalic acid.

According to a preferred embodiment, the polycondensation is carried out in the presence of one or more additional monomers. In particular, it can be carried out in the presence of one or more additional monomers forming a polyamide unit, such as a lactam, an ω-amino acid or a salt of diamine and dicarboxylic acid. The ω-amino acid is preferably chosen from aminoundecanoic acid. The lactam is preferably chosen from lauryllactam.

According to a particularly preferred embodiment, the process according to the invention is a process as defined above in which the cycloaliphatic diamine is bis(3-methyl-4-aminocyclohexyl)methane, the diacid is a mixture of terephthalic acid and isophthalic acid, and the polycondensation is carried out in the presence of aminoundecanoic acid.

According to another particularly preferred embodiment, the process according to the invention is a process as defined above in which the cycloaliphatic diamine is bis(3-methyl-4-aminocyclohexyl)methane, the diacid is a mixture of terephthalic acid and isophthalic acid, and the polycondensation is carried out in the presence of lauryllactam.

According to a second aspect, the invention is directed to the use of a cycloaliphatic diamine for the manufacture of a transparent polyamide, characterized in that the cycloaliphatic diamine is as described above.

Preferably, the diamine is chosen from bis(3-methyl-4-aminocyclohexyl)methane (also called BMACM or MACM or B), 2,2'-bis(3-methyl-4-aminocyclohexyl)propane, bis(3-methyl-5-ethyl-4-aminocyclohexyl)methane, bis(3,5-dimethyl-4-aminocyclohexyl)methane, bis(3,5-dimethyl-4-aminocyclohexyl)propane, bis(2,3-dimethyl-4-aminocyclohexyl)methane, bis(2,3-dimethyl-4-aminocyclohexyl)propane, bis(3,5-diethyl-4-aminocyclohexyl)methane, bis(3,5-diethyl-4-aminocyclohexyl)propane, bis(3-methyl-5-isopropyl-4-aminocyclohexyl)methane and bis(3-methyl-5-isopropyl-4-aminocyclohexyl)propane. Particular preference is given to bis(3-methyl-4-aminocyclohexyl)methane.

According to a third aspect, the invention is directed to a transparent polyamide able to be obtained by the process according to the invention.

According to a fourth aspect, the invention is directed to a formulation, in particular a transparent formulation, obtained from such a transparent polyamide via mixing with one or more other polymers, additives, fillers and/or modifiers.

According to a fifth and final aspect, the invention is lastly directed to articles, in particular transparent articles, obtained from such a transparent polyamide or from such a transparent formulation.

BRIEF DESCRIPTION OF THE FIGURES

The invention will be better understood in light of the description which follows and the figures, which show.

DESCRIPTION OF THE EMBODIMENTS

Definition of the Terms

Figure 1:
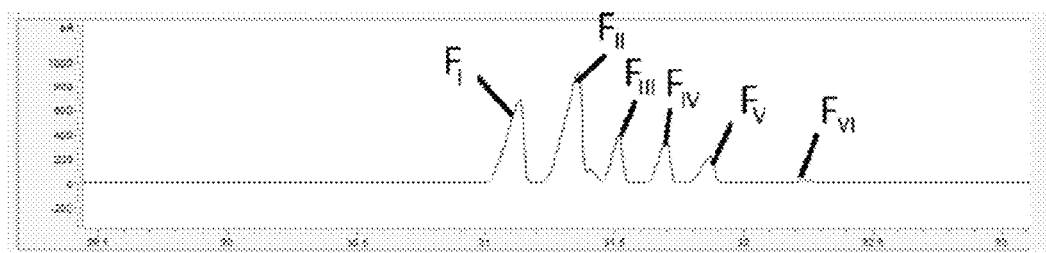
FIG. 1: a gas chromatogram (GC) of a BMACM batch (BMACM 1)

The term "monomer" should be taken in the context of polyamides in the sense of "repeat unit" or "repeating unit". Indeed, the case where a repeat unit of the polyamide consists of the combination of a diacid with a diamine is particular. It is considered that it is the combination of a diamine and a diacid, that is to say the diamine.diacid pair (in an equimolar amount), which corresponds to the monomer. This is explained by the fact that, individually, the diacid or the diamine is only a structural unit, which is not enough by itself alone to polymerize to give a polyamide.

The term "copolymer" is understood to denote a polymer derived from the copolymerization of at least two chemically different types of monomer, referred to as comonomers. A copolymer is thus formed from at least two repeating units. It may also be formed from three or more repeating units.

The term "amorphous polymer" is understood to denote polymers having an enthalpy of fusion, as measured by differential calorimetry during the second heating with a heating rate of 20° C./min, of at most equal to 30 J/g, in particular between 1 and 30 J/g or alternatively equal to 0 J/g.

The term "haze value" is understood to describe the transparency of a material in terms of light scattering at an angle of greater than 2.5° from the normal observed following interaction of the light with inhomogeneities present in the material. Unless mentioned otherwise, the haze value was estimated by visual inspection for the presence or absence of haze in the molten polymer in a test tube.

The term "isomer" is understood to denote compounds possessing the same empirical formula but a different stereochemical or structural formula. In the context of cycloaliphatic diamines, the isomers of interest are in particular the stereoisomers, and among these the configurational isomers, that is to say the enantiomers and diastereoisomers.

The polyamide nomenclature according to the standard ISO 16396-1:2015 has been used in the present description.

In its broadest definition, the present invention relates to a process for preparing a transparent polyamide by polycondensation of a cycloaliphatic diamine with a dicarboxylic acid, and if appropriate other comonomers, in which the isomeric profile of the cycloaliphatic diamine is chosen so as to minimize the formation of infusible compounds. Such a process makes it possible to obtain a polyamide having a transparency, in terms of haze, which remains satisfactory even when the polyamide has been exposed to elevated temperatures, for example 300° C., for a prolonged period, for example for 24 hours, 48 hours or 72 hours.

Due to their chemical structure, cycloaliphatic diamines exist in the form of numerous isomers, in particular stereoisomers. Gas chromatography (GC) analysis thus reveals several distinct peaks each consisting of a coelution of isomers, each of which is made up of a fraction of isomers.

More specifically, it is observed that the cycloaliphatic diamines used in the process according to the invention separate into six isomer fractions when they are subjected to gas chromatography (GC) on a nonpolar column under the experimental conditions described in the examples below.

In contrast to PACM, which separates into three isomer fractions, BMACM, which is a more complex cycloaliphatic diamine, since it bears an additional alkyl substituent on each ring, separates into six isomer fractions. These isomer fractions are identified in the present description as "fractions I-VI" and numbered in the order of their elution. Thus, the first fraction eluted is called isomer fraction I, the second fraction eluted is called isomer fraction II, etc.

The mass content $F_X$ of isomer fraction X is calculated from the areas of the peaks $A_I$ to $A_{VI}$ of the isomer fractions I to VI recorded on the chromatogram of the diamine as follows:

$$F_X = \frac{A_X}{(A_I + A_{II} + A_{III} + A_{IV} + A_V + A_{VI})} \cdot [100\%]$$

The isomeric profile of a cycloaliphatic diamine is given by the relative proportion of each isomer fraction which can be found by gas chromatography. It is then considered, taking into account their identical atomic composition and their very similar chemical structure, that these proportions represent the mass content of each isomer fraction in the cycloaliphatic diamine.

The discovery forming the basis of the invention is the observation that when such a cycloaliphatic diamine comprises 0 to 35%, preferably 0 and 33%, in particular between 0 and 30%, of isomer fraction I, the transparency of the polyamides in terms of haze met expectations and was preserved even under the effect of heat.

In addition, it was found that it was favorable in terms of haze of the polyamide obtained when the cycloaliphatic diamine was characterized by a mass content of isomer fraction $F_{II}$ which was greater than its mass content of isomer fraction $F_I$.

In addition, it was observed that it was advantageous for the cycloaliphatic diamine to have an isomeric profile with a difference $\Delta F_{II/I}$ between the mass content of isomer fraction II and isomer fraction I which is greater than 0% and preferably greater than 5% and very particularly more than 10%.

The difference in content $\Delta F_{Y/X}$ is calculate for each isomer fraction X and Y as follows:

$$\Delta F_{Y/X} = F_Y - F_X$$

PACM is commercially available with various contents of trans-trans stereoisomers. It was therefore possible to designate, among the three isomer fractions of this diamine, the isomer fraction emerging first in gas chromatography (GC) as being the trans-trans stereoisomers.

For more complex diamines such as BMACM, such grades are not commercially available and it is therefore more difficult to characterize each of these fractions at the structural level.

A matching of the respective contents of the isomer fractions with the relative contents of stereoisomers which can be deduced from the NMR spectra, explained in more detail in the examples, nevertheless makes it possible to formulate hypotheses with respect to the attribution of the isomer fractions I to VI.

Thus, it is assumed at this stage that the isomer fractions I and II are made up essentially, or even exclusively, of the trans-trans stereoisomers of the cycloaliphatic diamine. In addition, it is assumed that the isomer fractions III and IV are made up essentially, or even exclusively, of the cis-trans stereoisomers. Lastly, it is assumed that the isomer fractions V and VI are made up essentially, or even exclusively, of the cis-cis stereoisomers.

Advantageously, the process according to the invention is implemented with a cycloaliphatic diamine comprising two cyclohexane rings linked by a linear or branched alkylene group comprising 1 to 4 carbon atoms, in particular methylene or propylene, in which the cyclohexane rings are each substituted by an amine group, preferably at position 4, and one or two linear or branched alkyl groups comprising 1 to 6 carbon atoms, in particular methyl or ethyl. Advantageously, the process according to the invention is implemented with a cycloaliphatic diamine comprising two cyclohexane rings linked by a linear or branched alkylene group comprising 1 to 4 carbon atoms, in particular methylene or propylene, in which the cyclohexane rings are each substituted by an amine group, preferably at position 4, and one or two linear or branched alkyl groups comprising 1 to 6 carbon atoms, in particular methyl or ethyl. It is preferable for the two rings of the cycloaliphatic diamine to be bonded to the same carbon atom of the alkylene group.

A cycloaliphatic diamine chosen from bis(3-methyl-4-aminocyclohexyl)methane (also called BMACM or MACM or B), 2,2'-bis(3-methyl-4-aminocyclohexyl)propane, bis(3-methyl-5-ethyl-4-aminocyclohexyl)methane, bis(3,5-dimethyl-4-aminocyclohexyl)methane, bis(3,5-dimethyl-4-aminocyclohexyl)propane, bis(2,3-dimethyl-4-aminocyclohexyl)methane, bis(2,3-dimethyl-4-aminocyclohexyl)propane, bis(3,5-diethyl-4-aminocyclohexyl)methane, bis(3,5-diethyl-4-aminocyclohexyl)propane, bis(3-methyl-5-isopropyl-4-aminocyclohexyl)methane and bis(3-methyl-5-isopropyl-4-aminocyclohexyl)propane is particularly advantageous. Particular preference is given to bis(3-methyl-4-aminocyclohexyl)methane.

The process according to the invention is not particularly limited regarding the dicarboxylic acid(s) used. These diacids can in particular be chosen from linear or branched aliphatic carboxylic acids comprising 4 to 18 carbon atoms, in particular 4 to 12 and very particularly 4 to 6 carbon atoms.

Advantageously, the dicarboxylic acid used comprises or consists of an aromatic diacid, in particular terephthalic acid. Terephthalic acid can be used alone or in a mixture with other dicarboxylic acids, in particular isophthalic acid. Particular preference is given to a mixture of terephthalic acid and isophthalic acid comprising at least 50 mol %, in particular at least 60 mol % and very particularly at least 75 mol % of terephthalic acid relative to the mixture of terephthalic and isophthalic acids.

The use of diamines having a specific isomeric profile has proven to be particularly useful in the manufacture of transparent polyamides comprising terephthalic acid, in particular more than 30 mol %, in particular more than 50 mol %, in particular more than 60 mol %, in particular more than 70 mol %, in particular more than 80 mol %, in particular more than 90 mol %, and very particularly 100 mol % terephthalic acid relative to the total amount of moles of aromatic diacids in the mixture of monomers. This is because the results obtained suggest that polyamides based on terephthalic acid are particularly sensitive to transparency problems and that their sensitivity increases with the molar proportion of terephthalic acid in the mixture of dicarboxylic acids.

The molar ratio between the diamine(s) and the diacid(s) is generally between 0.9:1 to 1.1:1, in particular between 0.95:1 and 1.05:1, and is thus close to the stoichiometric ratio. Stoichiometric ratio is particularly preferred.

Certain preferred transparent polyamides are obtained by polycondensation of a cycloaliphatic diamine with a diacid and also a lactam and/or an ω-amino acid and/or a salt of diamine and of diacid.

The lactam(s) preferably has/have at least 7 carbon atoms and preferably 9 to 12 carbon atoms. They may be chosen in particular from caprolactone, lauryllactam (or lactam 12) and undecanolactam. Lauryllactam is particularly preferred.

The ω-amino acid(s) preferably has/have at least 7 carbon atoms and preferably 9 to 12 carbon atoms. Among them, mention may be made in particular of 10-aminodecanoic acid, 11-aminoundecanoic acid and 12-aminododecanoic acid. 11-aminoundecanoic acid is particularly preferred.

The diamine in the salt of diamine and of dicarboxylic acid is preferably chosen from aliphatic or cycloaliphatic diamines comprising 2 to 36, advantageously 4 to 18 and very particularly 6 to 16 carbon atoms. The dicarboxylic acid in the salt of diamine and of dicarboxylic acid is preferably an aliphatic or aromatic diacid advantageously comprising 4 to 36, advantageously 4 to 18 and very particularly 6 to 16 carbon atoms.

When additional monomers mentioned above are present, the molar ratio between on the one hand the additional monomers and on the other hand the cycloaliphatic diamine(s) and the diacid(s) is generally between 0.3/1 and 2.8/1, preferably between 0.5/1 and 2.0/1 and more preferably still between 0.6/1 and 1.5/1.

According to a particularly preferred embodiment, the process according to the invention is a process as defined above in which the cycloaliphatic diamine is bis(3-methyl-4-aminocyclohexyl)methane, the diacid is a mixture of terephthalic acid and isophthalic acid, and the polycondensation is carried out in the presence of aminoundecanoic acid.

According to another particularly preferred embodiment, the process according to the invention is a process as defined above in which the cycloaliphatic diamine is bis(3-methyl-4-aminocyclohexyl)methane, the diacid is a mixture of terephthalic acid and isophthalic acid, and the polycondensation is carried out in the presence of lauryllactam.

Processes for manufacturing polyamides by polycondensation are known per se. Such a process is for example described in detail in the patent EP 0 313 436 B1.

In this two-step process, a diacid oligomer is prepared in a first step by condensation of all of the monomers except for the cycloaliphatic diamine. The reaction is generally conducted in a reactor under inert atmosphere and/or under pressure while maintaining the reactants, preferably with stirring, at a temperature of between 200 and 320° C. and preferably of between 260 and 310° C. The reaction is generally conducted over 1 to 5 hours under atmospheric pressure or under an autogenous pressure of at most 30 bar.

In the second step, the cycloaliphatic diamine is added under atmospheric pressure to the diacid oligomer formed and this is reacted at a temperature of between 200 and 350° C., and better still between 250 and 310° C. The reaction is generally conducted in an inert atmosphere over 1 to 6 hours under vacuum and/or atmospheric pressure and/or a pressure of at most 20 bar. The diacid oligomer/cycloaliphatic diamine molar ratios used are between 1/0.9 and 1/1.1.

In this second step, known polyamidation catalysts such as phosphoric acid or hypophosphorous acid can advantageously be used. It is also possible in this second step to add to the reaction medium additives such as light and/or heat stabilizers, colorants, optical brighteners, plasticizers, surfactants, nucleating agents, lubricants, mold release agents, flame retardants, chain regulators or defoamers.

It is also possible to envisage a single-step polycondensation process as described for example in the patent WO 09153534. More specifically, the monomers and optional additives can be introduced into an autoclave reactor which is closed and then heated with stirring. After a phase of holding under autogenous pressure for 2 hours, the pressure is then reduced over 1.5 hours to atmospheric pressure. The reactor is then degassed for approximately 1 hour. The copolyamide obtained is then extruded in the form of rods, cooled in a water tank at ambient temperature and then granulated.

This can be a batch process or a continuous process.

The polyamides thus obtained can then be formulated in order to optimize their properties.

In particular, they can be mixed with other thermoplastic materials, in particular other homo- or copolyamides, for example PA11, PA12, PA66, PA612, PA1010 and/or PA1012, in order to form alloys. These constituents are preferably added in such an amount as to represent 0 to 50% by weight of the alloy obtained. The mixing may for example be carried out by kneading granules in the molten state, for example in an extruder.

It is also possible to add to the polyamide at this stage one or more additives such as light and/or heat stabilizers, colorants, pigments, optical brighteners, plasticizers, surfactants, nucleating agents, lubricants, mold release agents, natural waxes, flame retardants or else chain regulators.

It is likewise also possible to add fillers and modifiers to the polyamide, in particular in order to reinforce its mechanical performance.

The formulation based on the transparent polyamide can in particular be transparent. In this case, the fillers and modifiers chosen are advantageously transparent. They may be chosen from glass or carbon fibers or beads or else impact modifiers.

The term "impact modifier" should be understood as meaning a polyolefin-based polymer with a flexural modulus of less than 100 MPa (as measured at 23° C. according to standard ISO-178:2010) and a Tg of less than 0° C. (as measured according to standard 11357-2 at the inflection point of the DSC thermogram), in particular a polyolefin, optionally coupled with a PEBA (polyether block amide) having a flexural modulus <200 MPa. It would not constitute a departure from the scope of the invention to use a PEBA alone as impact modifier in the composition.

The polyolefin of the impact modifier may be functionalized or nonfunctionalized or be a mixture of at least one which is functionalized and/or at least one which is nonfunctionalized.

In particular, a portion or all of the polyolefins bears a function chosen from carboxylic acid, carboxylic anhydride and epoxide functions, and is in particular chosen from a copolymer of ethylene and propylene with elastomeric character (EPR), an ethylene-propylene-diene copolymer with elastomeric character (EPDM) and an ethylene/alkyl (meth) acrylate copolymer, an ethylene-higher alkene copolymer, in particular an ethylene-octene copolymer, or an ethylene-alkyl acrylate-maleic anhydride terpolymer.

Advantageously, the impact modifier is chosen from Fusabond® F493, a Pebax® product, in particular Pebax® 40R53 SP01, a Lotader® product, in particular Lotader® 5500 or Lotader® 7500, Exxelor® VA1803, or a mixture of these, in which case they are in a ratio ranging from 0.1/99.9 to 99.9/0.1, preferentially 1/2 to 2/1 when they are in a mixture of two.

By way of example, the impact modifier is chosen from the following mixtures: Fusabond® 493/Lotader®, in particular Fusabond® 493/Lotader® 5500 or Fusabond® 493/Lotader® 7500.

The impact modifier may also be a modifier of "core-shell" type, also denoted "copolymer of core-shell type". The modifier of "core-shell type" is in the form of fine particles with an elastomer core and at least one thermoplastic shell; the size of the particles is generally less than a micrometer and advantageously from 150 to 500 nm. The modifier of "core-shell type" has an acrylic or butadiene base, unlike the impact modifier which has a polyolefin base.

Advantageously, the proportion of impact modifier is from 0% to 10% by weight relative to the total weight of the composition.

The transparent polyamides able to be obtained by the process described, optionally in formulated form, are useful for the manufacture of superior-quality articles, in particular transparent articles.

The invention will be explained in more detail in the examples which follow.

EXAMPLES

1. Determination of the Isomeric Profile of BMACM by GC-FID

Reactants
BMACM reference standard: Bis(3-methyl-4-aminocyclohexyl)methane stereoisomer mixture—99% purity (CAS 6864-37-5, sold by Sigma-Aldrich)
BMACM for analysis: BMACM 1 and BMACM 2
Ethanol: Anhydrous absolute ethanol Carlo Erba purity >99.99%
Internal standard: Benzophenone (CAS 119-61-9, sold by Sigma-Aldrich), as solution formed by introducing 250 mg into a 100 mL volumetric flask, made up with ethanol.

Instruments
Gas chromatography (GC) (Agilent® 6890 model sold by Agilent)
GC/FID Conditions
GC/FID analyses were performed with the following configuration:
Column: capillary, 5% polysilphenylene siloxane (BPX5 sold by SGE), length 30 m, diameter 250 μm, film thickness 0.5 μm
Injection temperature: 250° C.
Split ratio: 1/50
Temperature program: 70° C. (2 min), 70° C.-185° C. (ramp of 8° C./min), 185° C. (10 min), 185-320° C. (ramp of 10° C./min), 320° C. (10 min)
Detector: FID—flame ionization, temperature: 310° C.
The samples were injected using an autosampler.
The isomers are eluted in distinct groups depending on the volatilization temperature and the interaction with the column. In addition to the peak due to the internal standard, six other peaks are observed corresponding to the six fractions of BMACM, called isomer fractions I to VI in the order of emergence from the chromatographic column.

Figure 2:
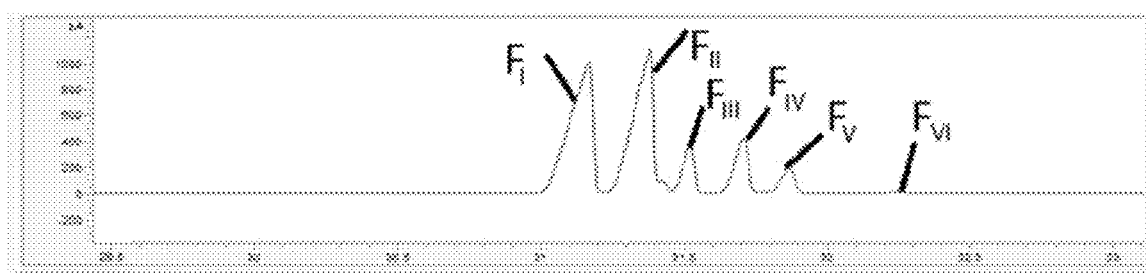
FIG. 2: a gas chromatogram (GC) of another BMACM batch (BMACM 2)
Figure 3:
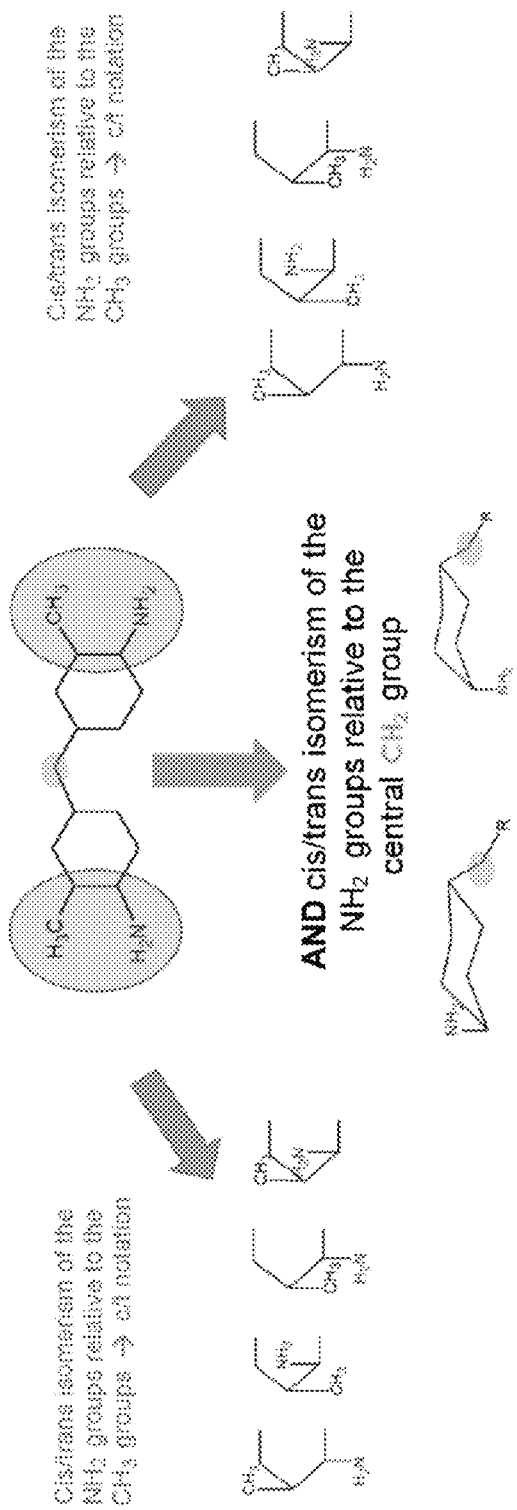
FIG. 3: a diagram illustrating the sources of stereoisomerism in the diamine bis(3-methyl-4-aminocyclohexyl)methane.

Two diamine batches BMACM 1 and BMACM 2 were analyzed using the method described above (see FIG. 1 and FIG. 2). The retention times of the isomer fractions are collated in table 1 below.

TABLE 1

GC retention time of isomer fractions

| Stereoisomer fraction | Retention time Rt [min] |
|---|---|
| I | 31.13 |
| II | 31.36 |
| III | 31.52 |
| IV | 31.70 |
| V | 31.87 |
| VI | 32.26 |

The mass content of isomer fractions $F_I$-$F_{VI}$ of the two BMACM diamine batches was calculated from the areas of the respective peaks relative to the sum of the areas. The difference between the mass content of isomer fraction II and I, $\Delta F_{II/I}$. These results are collated in table 2 below.

TABLE 2

Mass content of isomer fractions of BMACM batches

| BMACM batches | $F_I$ [%] | $F_{II}$ [%] | $F_{III}$ [%] | $F_{IV}$ [%] | $F_V$ [%] | $F_{VI}$ [%] | $\Delta F_{II/I}$ [%] |
|---|---|---|---|---|---|---|---|
| Reference standard | 28.9 | 40.8 | 9.6 | 11.9 | 7.6 | 1.2 | 11.9 |
| BMACM 1 | 29.2 | 41.9 | 10.7 | 10.5 | 6.9 | 0.8 | 12.7 |
| BMACM 2 | 38.3 | 40.1 | 8.8 | 8.9 | 3.7 | 0.3 | 1.8 |

2. NMR Analysis

In order to match the isomer fractions observed to the various stereoisomers of BMACM, various batches of BMACM were studied by GC/FID and by NMR (Bruker avance® 400 MHz).

On the one hand, the mass content of isomer fraction I-VI was determined from the chromatogram as explained in the previous section.

On the other hand, the NMR spectrum was used to calculate the relative area of the lines corresponding to the cycloaliphatic hydrogen atom adjacent to the amine group on the ring in the trans and cis position to the carbon atom of the central methylene group, respectively. The relative area of the hydrogen atoms located in the trans position to the carbon atom of the methylene group is denoted T and the relative area of the hydrogen atoms located in the cis position to the carbon atom of the methylene group is denoted C.

The respective results obtained are collated in table 3 below.

TABLE 3

Mass content of isomer fractions by GC and NMR data

| BMACM batches | Mass content of isomer fractions by GC [%] | | | | | | Relative area of the trans and cis lines [%] | |
|---|---|---|---|---|---|---|---|---|
| | $F_I$ | $F_{II}$ | $F_{III}$ | $F_{IV}$ | $F_V$ | $F_{VI}$ | % T | % C |
| Reference standard | 28.9 | 40.8 | 9.6 | 11.9 | 7.6 | 1.2 | 71.5 | 28.5 |
| BMACM 2 | 38.3 | 40.1 | 8.8 | 8.9 | 3.7 | 0.3 | 82 | 18 |

On the basis of the relative areas % T and % C in table 3 above, it is possible, by assuming that the structure of the two rings in the diamine is independent, to estimate the content of trans-trans (% TT), cis-trans (% CT) and cis-cis (% CC) stereoisomers in the BMACM as follows:

% TT=(% T)$^2$

% CT=2×% C×% T

% CC=(% C)$^2$

The estimations for the % TT, % CT and % CC contents are collated in table 4 below.

TABLE 4

Contents of stereoisomers estimated from the analysis of the NMR spectrum

| | Content of trans-trans (% TT), cis-trans (% CT) and cis-cis (% CC) stereoisomers, [%] | | |
|---|---|---|---|
| BMACM batches | % TT | % CT | % CC |
| Reference standard | 52 | 40 | 8 |
| BMACM 2 | 67 | 30 | 3 |

The comparison of the contents of different stereoisomers in table 4 with the results of the GP/FID analysis in table 3 makes it possible to match the isomer fractions to the trans-trans, cis-trans and cis-cis stereoisomers, respectively.

Specifically, it is observed by comparing the data for the two batches of BMACM that when the isomer fractions $F_I$ and $F_{II}$ increase, the content of trans-trans isomers % TT also increases. It is also observed that when the isomer fractions $F_V$ and $F_{VI}$ decrease, the content of cis-cis isomers % CC also decreases.

In addition, by assuming that the respective stereoisomers collect together in one or two common, close fractions, the only fractions large enough to contain the content of trans-trans stereoisomers % TT are the isomer fractions I and II. Analogously, it is observed that the content of isomer fractions V and VI corresponds numerically to the contents of cis-cis stereoisomers % CC.

Such a matching is confirmed by the results for PACM which attributed the trans-trans stereoisomers to the isomer fraction eluted first.

Example 1: Effect of the Isomeric Profile on the Transparency of PA 12/BI/BT

The impact of the isomeric profile of the BMACM on the transparency of the polyamide was evaluated by preparing a polyamide with BMACM diamines of differing isomeric profile and by estimating the haze of the polyamide obtained after thermal exposure.

A polyamide 12/BI/BT was prepared as follows. A suitable reactor equipped with a Paravisc stirrer is charged with the starting materials in the proportions indicated in table 5 below. The reactor is then inertized by purging 3 times with 30 bar of nitrogen followed each time by a return to atmospheric pressure. The reactor is then heated for 2 hours 30 minutes to a temperature of 285° C. with stirring at 100 rpm. The reaction is maintained under the pressure and temperature conditions for 2 hours and then the pressure is reduced to atmospheric pressure over 1 hour while aiming for a temperature of 290° C.

As BMACM, BMACM 1, BMACM 2 and various mixtures of these two batches were used. The isomeric profile of the various batches and mixtures is indicated in table 6 below.

TABLE 5

Composition of the starting materials used for the synthesis of the PA 12/BI/BT

| Starting materials | Amount |
|---|---|
| Lactam 12 | 13.12 g |
| BMACM | 15.841 g |
| Isophthalic acid | 3.433 g |
| Terephthalic acid | 7.606 g |
| Demineralized water | 2.8 g |
| 5% $H_3PO_2$ | 0.040 g |
| Silicone oil 1000 | 1 drop |

TABLE 6

Isomeric profile of the BMACM batches and mixtures (by GC/FID)

| Ratio BMACM 2/ BMACM 1 | $F_I$ [%] | $F_{II}$ [%] | $F_{III}$ [%] | $F_{IV}$ [%] | $F_V$ [%] | $F_{VI}$ [%] | $\Delta F_{II/I}$ [%] |
|---|---|---|---|---|---|---|---|
| 100/0 | 38.3 | 40.1 | 8.8 | 8.9 | 3.7 | 0.3 | 1.8 |
| 78/22 | 35.2 | 39.7 | 9.0 | 10.0 | 5.4 | 0.7 | 4.5 |
| 50/50 | 33.1 | 40.4 | 9.5 | 10.3 | 6.0 | 0.8 | 7.3 |
| 22/78 | 30.7 | 41.1 | 10.2 | 10.5 | 6.6 | 0.9 | 10.4 |
| 91/09 | 36.3 | 39.3 | 8.4 | 10.1 | 5.2 | 0.7 | 3.0 |
| 96/04 | 36.7 | 39.3 | 8.3 | 10.0 | 5.1 | 0.7 | 2.6 |
| 0/100 | 29.2 | 41.9 | 10.7 | 10.5 | 6.9 | 0.8 | 12.7 |

The polyamides thus obtained initially have zero haze. They are then heated to 300° C. in a test tube for 48 hours under inert atmosphere, during which time the haze of the molten medium was evaluated visually at 300° C. at various time intervals.

The results are collated in table 7 below.

TABLE 7

Haze of the polyamide as a function of the mass content of isomer fractions I and II

| Ratio BMACM 2/ BMACM 1 | Mass content of isomer fraction [%] | | | Haze after exposure to 300° C. Evaluated at ambient temperature | | | |
|---|---|---|---|---|---|---|---|
| | $F_I$ | $F_{II}$ | $\Delta F_{II/I}$ | T0 + 9 h 00 | T0 + 24 h 00 | T0 + 28 h 00 | T0 + 48 h 00 |
| 100/0 | 38.3 | 40.1 | 1.8 | 0 | 1 | 1 to 2 | 3 to 4 |
| 96/04 | 36.7 | 39.3 | 2.6 | 0 | 1 | 1 to 2 | 3 to 4 |
| 91/09 | 36.3 | 39.3 | 3.0 | 0 | 0 | 1 | 2 to 3 |
| 78/22 | 35.2 | 39.7 | 4.5 | 0 | 0 | 1 | 2 to 3 |
| 50/50 | 33.1 | 40.4 | 7.3 | 0 | 0 | 0 | 0 to 1 |
| 22/78 | 30.7 | 41.1 | 10.4 | 0 | 0 | 0 | 0 |
| 0/100 | 29.2 | 41.9 | 12.7 | 0 | 0 | 0 | 0 |

0: no haze,
1: very slight haze,
2: slight haze,
3: moderate haze,
4: pronounced haze These results demonstrate that the polyamides obtained with a BMACM comprising a mass content of isomer fraction I not exceeding 35% have a transparency in terms of haze which is preserved after exposure to a heat treatment. On the other hand, it is noted that these BMACMs exhibit a difference in mass content of isomer fraction II and I which exceeds 5%.

Examples 2-5: Effect of the Isomeric Profile of the BMACM on the Transparency of a PA 11/BI/BT The impact of the content of terephthalic acid on the transparency of a polyamide after exposure to heat was evaluated by preparing polyamides having a variable proportion of terephthalic acid and evaluating the haze after thermal exposure.

Various polyamides 11/BI/BT were prepared as explained in example 1, by charging the starting materials in the proportions indicated in table 8 below.

TABLE 8

Starting materials used for the synthesis of the PA 11/BI/BT

| Starting materials | Amount of material | | |
|---|---|---|---|
| | Example 2 | Example 3 | Examples 4 and 5 |
| 11-Aminoundecanoic acid | 24.41 g | 24.41 g | 24.41 g |
| BMACM | 26.87 g | 26.87 g | 26.87 g |
| Isophthalic acid | 13.1 g | 9.36 g | 5.62 g |
| Terephthalic acid | 5.62 g | 9.36 g | 13.1 g |
| Demineralized water | 2.8 g | 2.8 g | 2.8 g |
| 5% $H_3PO_2$ | 0.070 g | 0.070 g | 0.070 g |

The various polyamides 11/BI/BT thus manufactured initially have zero haze. They were then heated to 300° C. and kept at this temperature under nitrogen flushing for 72 hours. After cooling to ambient temperature, the haze of the polyamides was evaluated visually. Table 9 below collates the results obtained.

It is observed that the haze is zero for the polyamides when the mixture of terephthalic acid and of isophthalic acid comprises at most 50 mol % of terephthalic acid relative to the mixture of terephthalic and isophthalic acids (examples 2 and 3). When the mixture comprises more terephthalic acid (examples 4 and 5), the polyamide nevertheless still exhibits zero haze when it has been prepared with a BMACM having a mass content of isomer fraction I not exceeding 35%.

TABLE 9

Haze of polyamides PA 11/BI/BT with various contents of terephthalic acid

| Example | BMACM | Formulation | Molar ratio | Haze after exposure for 48 hours at 300° C. |
|---|---|---|---|---|
| 2 | 2 | 11/BI/BT | 1.076/0.7/0.3 | 0 |
| 3 | 2 | 11/BI/BT | 1.076/0.5/0.5 | 0 |
| 4 | 2 | 11/BI/BT | 1.076/0.3/0.7 | 4 |
| 5 | 1 | 11/BI/BT | 1.076/0.3/0.7 | 0 |

0: no haze,
1: very slight haze,
2: slight haze,
3: moderate haze,
4: pronounced haze It can be seen from these results that firstly the polyamides obtained with a high ratio of terephthalic acid are more sensitive to a loss of transparency after exposure to heat.

Nevertheless, all of the results also demonstrate that the choice of a diamine with a suitable isomeric profile makes it possible to ensure robust transparency of the polyamide, including when the polyamide comprises a high molar ratio of terephthalic acid.

The study thus demonstrates that the use of a BMACM having a mass content of isomer fraction I not exceeding 35% makes it possible to obtain polyamides having a transparency which is preserved even after a heat treatment, even for polyamides with a high molar ratio of terephthalic acid.

LIST OF THE DOCUMENTS CITED

EP 0 313 436 A1
FR 1 541 384
Prince, Frank R., Pearce, Eli M., Macromolecules 4/3, pp 347-350, 5/1971

The invention claimed is:

1. A process for manufacturing a transparent polyamide comprising a step of polycondensation of a mixture of monomers comprising at least one dicarboxylic acid and at least one cycloaliphatic diamine,
   in which the cycloaliphatic diamine comprises two rings linked by an alkylene group comprising 1 to 6 carbon atoms, each ring being substituted by an amine group and at least one alkyl group, which may be identical or different, comprising 1 to 6 carbon atoms,
   wherein the diamine decomposes into six isomer fractions when it is subjected to analysis by gas chromatography on a nonpolar column and wherein, when said isomer fractions are named isomer fractions I to VI in their order of elution, the mass content $F_I$ of fraction I of said cycloaliphatic diamine does not exceed 33%,
   wherein the dicarboxylic acid is a mixture of terephthalic acid and isophthalic acid comprising at least 50 mol % of terephthalic acid,
   wherein the cycloaliphatic diamine is bis(3-methyl-4-aminocyclohexyl)methane and the polycondensation is carried out in the presence of lauryllactam or aminoundecanoic acid.

2. The process as claimed in claim 1, in which at least one cycloaliphatic diamine is characterized by a mass content of isomer fraction $F_{II}$ which is greater than its mass content of isomer fraction $F_I$.

3. The process as claimed in claim 1, in which the at least one cycloaliphatic diamine is characterized by a difference $\Delta F_{II/I}$ between the mass content of isomer fraction II and isomer fraction I which is greater than 0%.

4. The process as claimed in claim 1, in which the dicarboxylic acid is a mixture of terephthalic acid and isophthalic acid comprising at least 60 mol % of terephthalic acid.

5. The process as claimed in claim 1, in which the polycondensation is carried out in the presence of aminoundecanoic acid.

6. The process as claimed in claim 1, in which the polycondensation is carried out in the presence of lauryllactam.

7. A transparent polyamide obtained by the process as claimed in claim 1.

8. A formulation obtained from a transparent polyamide as claimed in claim 7 via mixing with one or more other polymers, additives, fillers and/or modifiers.

9. Articles obtained from a transparent polyamide as claimed in claim 7.

10. The process as claimed in claim 1, in which the dicarboxylic acid is a mixture of terephthalic acid and isophthalic acid comprising at least 75 mol % of terephthalic acid.

11. The process as claimed in claim 1, in which the mass content $F_I$ of fraction I of said cycloaliphatic diamine does not exceed 30%.

\* \* \* \* \*